United States Patent
Fodor et al.

(10) Patent No.: US 9,974,084 B2
(45) Date of Patent: May 15, 2018

(54) NETWORK NODES, A USER EQUIPMENT AND METHODS THEREIN FOR HANDLING CELLULAR AND D2D COMMUNICATIONS IN A WIRELESS COMMUNICATIONS NETWORK

(71) Applicant: Telefonaktiebolaget LM Ericsson (publ), Stockholm (SE)

(72) Inventors: Gabor Fodor, Hässelby (SE); Muhammad Kazmi, Bromma (SE); Yi-Pin Eric Wang, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 145 days.

(21) Appl. No.: 15/031,343

(22) PCT Filed: Dec. 20, 2013

(86) PCT No.: PCT/SE2013/051607
§ 371 (c)(1),
(2) Date: Apr. 22, 2016

(87) PCT Pub. No.: WO2015/060761
PCT Pub. Date: Apr. 30, 2015

(65) Prior Publication Data
US 2016/0278095 A1  Sep. 22, 2016

(30) Foreign Application Priority Data
Oct. 23, 2013  (WO) .................. PCT/SE2013/051235

(51) Int. Cl.
*H04W 4/00*  (2018.01)
*H04W 72/04*  (2009.01)
(Continued)

(52) U.S. Cl.
CPC ...... *H04W 72/0486* (2013.01); *H04B 7/0413* (2013.01); *H04B 7/0456* (2013.01);
(Continued)

(58) Field of Classification Search
CPC ........... H04W 72/0486; H04W 72/044; H04W 72/0446; H04W 72/0453; H04W 72/082;
(Continued)

(56) References Cited

U.S. PATENT DOCUMENTS

| 6,463,286 B1 * | 10/2002 | Salminen | .......... H04W 36/0066 455/432.1 |
| 8,538,450 B2 * | 9/2013 | Zhang | ................. H04W 52/146 455/453 |

(Continued)

FOREIGN PATENT DOCUMENTS

| WO | 2010145710 A1 | 12/2010 |
| WO | 2012144941 A1 | 10/2012 |

OTHER PUBLICATIONS

3GPP, "3rd Generation Partnership Project; Technical Specification Group SA; Feasibility Study for Proximity Services (ProSe) (Release 12)", 3GPP TR 22.803 V2.0.0, Nov. 2012, 1-39.

(Continued)

*Primary Examiner* — Kevin Mew
(74) *Attorney, Agent, or Firm* — Sage Patent Group

(57) ABSTRACT

A method performed by a network node (110) for assisting cellular communications and Device-to-Device, D2D, communications of a first set of user equipments (123, 124, 125, 143 144) served by at least one neighboring network node (111, 112) in a wireless telecommunications network (100) is provided. The network node (110) determines a load on at least one Physical Radio Resource, PRR, which PRR is assigned to a second set of user equipments (121, 122, 141, 142) served by the network node (110) for cellular and/or
(Continued)

D2D communications. The network node (101, 102) then transmits an indication of the load to the at least one neighboring network node (111, 112), wherein the load indication further indicates that the load on the at least one PRR is caused by cellular and/or D2D communications of the second set of user equipments (121, 122, 141, 142) served by the network node (110). A network node (103) for handling cellular communications and D2D communications, user equipments (121, 122, 141, 142) and methods performed therein are also provided.

32 Claims, 6 Drawing Sheets

(51) Int. Cl.
| | |
|---|---|
| H04B 7/0413 | (2017.01) |
| H04B 7/0456 | (2017.01) |
| H04W 72/08 | (2009.01) |
| H04W 76/02 | (2009.01) |
| H04W 52/38 | (2009.01) |
| H04W 84/04 | (2009.01) |
| H04W 92/18 | (2009.01) |
| H04B 7/0452 | (2017.01) |

(52) U.S. Cl.
CPC ....... H04W 52/383 (2013.01); H04W 72/044 (2013.01); H04W 72/0446 (2013.01); H04W 72/0453 (2013.01); H04W 72/082 (2013.01); H04W 76/023 (2013.01); H04W 76/14 (2018.02); *H04B 7/0452* (2013.01); *H04W 84/042* (2013.01); *H04W 92/18* (2013.01)

(58) Field of Classification Search
CPC ............. H04W 52/383; H04W 76/023; H04W 84/042; H04W 92/18; H04B 7/0413; H04B 7/0452; H04B 7/0456
See application file for complete search history.

(56) References Cited

U.S. PATENT DOCUMENTS

| | | | | |
|---|---|---|---|---|
| 9,026,140 | B2* | 5/2015 | Siomina | H04W 64/00 |
| | | | | 455/456.1 |
| 9,635,567 | B2* | 4/2017 | Bienas | H04W 24/02 |
| 9,918,318 | B2* | 3/2018 | Fujishiro | H04W 72/048 |
| 2008/0242301 | A1* | 10/2008 | Osterling | H04W 36/08 |
| | | | | 455/436 |
| 2010/0261469 | A1* | 10/2010 | Ribeiro | H04W 99/00 |
| | | | | 455/423 |
| 2011/0275382 | A1* | 11/2011 | Hakola | H04W 24/10 |
| | | | | 455/452.2 |
| 2012/0113794 | A1* | 5/2012 | Roman | H04B 7/0452 |
| | | | | 370/201 |
| 2013/0150051 | A1* | 6/2013 | Van Phan | H04W 76/14 |
| | | | | 455/437 |
| 2013/0157676 | A1 | 6/2013 | Baek et al. | |
| 2014/0056134 | A1* | 2/2014 | Koskinen | H04W 48/06 |
| | | | | 370/230 |
| 2015/0010010 | A1* | 1/2015 | Xie | H04W 76/022 |
| | | | | 370/401 |
| 2016/0112877 | A1* | 4/2016 | Tseng | H04W 12/08 |
| | | | | 455/414.2 |
| 2016/0262204 | A1* | 9/2016 | Sorrentino | H04W 76/14 |
| 2018/0048986 | A1* | 2/2018 | Adachi | H04W 4/70 |

OTHER PUBLICATIONS

Anton-Haro, Carles et al., "Cross-Layer Scheduling for Multi-User MIMO Systems", IEEE Communications Magazine, Sep. 2006, 39-45.
Doppler, Klaus et al., "Device-to-Device Communication as an Underlay to LTE-Advanced Networks", IEEE Communications Magazine, vol. 47, Issue 12, Dec. 2009, 42-49.
Fodor, Gabor et al., "Design Aspects of Network Assisted Device-to-Device Communications", IEEE Communications Magazine, vol. 50, Issue 3, May 2011, 2-9.

* cited by examiner

| DMLI ID | D2D and MIMO users share PRR |
|---|---|
| 0 | No |
| 1 | Yes |

| DMLI ID | D2D and/or MIMO users share PRR |
|---|---|
| 0 | No |
| 1 | D2D only |
| 2 | MIMO only |
| 3 | Both D2D and MIMO |

Start → 201. Determining load → 202. Transmitting indication of load → End

| DMLI ID | D2D and/or MIMO users share PRR | Stream sharing between D2D and MIMO users |
|---|---|---|
| 0 | No | NA |
| 1 | D2D only | NA |
| 2 | MIMO only | NA |
| 3 | Both D2D and MIMO | All orthogonal streams |
| 4 | Both D2D and MIMO | All shared streams |

Fig. 5

| DMLI ID | Combined load of D2D and/or MIMO on PRR | Description |
|---|---|---|
| 0 | Low | One or few MIMO and D2D users share same PRR |
| 1 | Medium | Moderate number of MIMO and D2D users share same PRR |
| 2 | High | High number of MIMO and D2D users share same PRR |
| 3 | Overload/Very high | Very high number of MIMO and D2D users share same PRR |

Fig. 6

NETWORK NODES, A USER EQUIPMENT AND METHODS THEREIN FOR HANDLING CELLULAR AND D2D COMMUNICATIONS IN A WIRELESS COMMUNICATIONS NETWORK

TECHNICAL FIELD

Embodiments herein relate to cellular and D2D communication in a wireless telecommunications network. In particular, embodiments herein relate to network nodes, a user equipment and methods therein for handling cellular communications and D2D communications in a wireless telecommunications network.

BACKGROUND

In a typical cellular network, also referred to as a wireless communication network or system, User equipment, UEs, communicate via a Radio Access Network, RAN, to one or more core networks, CNs.

A user equipment is a mobile terminal by which a subscriber may access services offered by an operator's core network and services outside operator's network to which the operator's RAN and CN provide access. The user equipment may be for example communication devices such as mobile telephones, cellular telephones, smart phones, tablet computers or laptops with wireless capability. The user equipment may be portable, pocket-storable, hand-held, computer-comprised, or vehicle-mounted mobile devices, enabled to communicate voice and/or data, via the radio access network, with another entity, such as another mobile station or a server. The user equipments are enabled to communicate wirelessly in the cellular network. The communication may be performed e.g. between two user equipments, between a user equipment and a regular telephone and/or between the user equipment and a server via the RAN and possibly one or more CNs, comprised within the cellular network.

The RAN covers a geographical area which is divided into cell areas, with each cell area being served by a base station, e.g. a Radio Base Station, RBS, which in some RANs is also called eNodeB, eNB, NodeB, B node or network node. A cell area is a geographical area where radio coverage is provided by the radio base station at a base station site. Each cell area is identified by an identity within the local radio area, which is broadcast in the cell area. The base stations communicate over the air interface operating on radio frequencies with the user equipment within range of the base stations. It should be noted that a base station may serve one or more cells, also referred to as cell carriers, within its cell area.

Multi-User Multiple Input Multiple Output, MU-MIMO, is technology that may be implemented in a wireless telecommunications network. This allows distinct UEs to transmit and receive separate data streams to and from a central Access Point, AP, such as, e.g. an eNB in a Long Term Evolution, LTE, wireless communications network. When used for uplink transmissions, MU-MIMO may sometimes also be referred to as virtual MIMO. This is because multiple UEs, which potentially may only be equipped with a single transmit antenna, may effectively form a MIMO system similar to a single UE that is equipped with multiple transmit antennas. The difference is that, in MU-MIMO, the different transmit antennas may belong to distinct UEs.

MU-MIMO is attractive because it may take advantage of spatial separation of multiple UEs and multiple data streams. Thereby, it may also increase the spectral efficiency in the wireless communications network. Hence, MU-MIMO may also facilitate the reuse of radio resources at the expense of a minor increase of the intra-cell interference.

It follows that in a wireless communications network using MU-MIMO, an important issue is how to select the group of UEs that is to share radio resources at a given point in time. This UE grouping or MU-MIMO scheduling is often controlled by the Medium Access Control, MAC, layer in the network node. It is typically also not incorporated into any standard specifications, but nonetheless form an important proprietary part of MU-MIMO implementation in a wireless communications network.

Device-to-Device, D2D, communications of user equipments is also a technology that may be implemented in a wireless telecommunications network. This allows user equipments that are in the proximity of each other to discover one another, and establish a direct link to each other rather than a link via a network node. The setup of this direct link of the D2D communication may be assisted by the wireless communications network.

The direct link of a D2D communication between user equipments may also reuse the same radio resources that are used for cellular communications in the wireless communications network, either in the downlink (DL), uplink (UL) or both. Typically, D2D UEs use UL radio resources of the wireless communications network in their D2D communication, such as, e.g. UL PRBs or UL time slots, but may possibly also use DL radio resources, such as, e.g. the cellular DL spectrum or DL time slots.

This reuse of the same resource may lead to an increase of spectral efficiency in the wireless communications network, but also here at the expense of an increase of the intra-cell interference. From a resource reuse point of view, there is thus some similarity to the resource reuse in MU-MIMO, with the difference that in D2D communications the communicating UEs are distinct, whereas in MU-MIMO the separate UEs may all communicate with the same physical entity, such as, e.g. an LTE eNB.

In a wireless communications network supporting both MU-MIMO and D2D communications in its cellular spectrum, it is thus even more important to address the issue of how a network node should allocate radio resources, transmit powers, etc., to a set of UEs comprising both MU-MIMO and D2D users. This may also be described as how the network node should schedule a group of MU-MIMO and D2D UEs that share the same or overlapping resources for signal transmission in the wireless communications network. If not solved properly, this may lead to severe increases in interference, degradations in spectral efficiency and capacity, and/or problems with Quality-of-Service, QoS, at the UEs. It is also clear that the conventional multiplexing in MU-MIMO systems, i.e. using diversity—spatial multiplexing trade off, is going to be affected by the presence of non-orthogonal D2D communications between UEs in the cellular spectrum.

SUMMARY

It is an object of embodiments herein to alleviate at least some of the effects indicated above caused by the sharing of resources in a wireless telecommunications network handling cellular and D2D communications.

According to a first aspect of embodiments herein, the object is achieved by a method performed by a network node for assisting cellular communications and Device-to-Device, D2D, communications of a first set of user equipments served by at least one neighboring network node in a wireless telecommunications network. The network node determines a load on at least one Physical Radio Resource, PRR, which PRR is assigned to a second set of user equipments served by the network node for cellular and/or D2D communications. The network node then transmits an indication of the load to the at least one neighboring network node, wherein the load indication further indicates that the load on the at least one PRR is caused by cellular and/or D2D communications of the second set of user equipments served by the network node.

According to a second aspect of embodiments herein, the object is achieved by a network node for assisting cellular communications and D2D communications of a first set of user equipments served by at least one neighboring network node in a wireless telecommunications network. The network node is configured to determine a load on at least one PRR, which PRR is assigned to a second set of user equipments served by the network node for cellular and/or D2D communications. The network node is also configured to transmit an indication of the load to the at least one neighboring network node, wherein the load indication further indicates that the load on the at least one PRR is caused by cellular and/or D2D communications of the second set of user equipments served by the network node.

According to a third aspect of embodiments herein, the object is achieved by a method performed by a network node for handling cellular communications and D2D communications of a first set of user equipments served by the network node in a wireless telecommunications network. The network node receives, from at least one neighboring network node, at least one load indication for at least one PRR, wherein the at least one load indication indicates that a load on the at least one PRR is caused by cellular and/or D2D communications of a second set of user equipments served by the at least one neighboring network node. Then, the network node schedules at least one of cellular and D2D communications of the user equipments on the at least one PRR based on the at least one received load indication.

According to a fourth aspect of embodiments herein, the object is achieved by a network node for handling cellular communications and D2D communications of a first set of user equipments served by the network node in a wireless telecommunications network. The network node is configured to receive, from at least one neighboring network node, at least one load indication for at least one PRR, wherein the at least one load indication indicates that a load on the at least one PRR is caused by cellular and/or D2D communications of a second set of user equipments served by the at least one neighboring network node. The network node is further configured to schedule at least one of cellular and D2D communications of the user equipments on the at least one PRR based on the at least one received load indication.

According to a fifth aspect of embodiments herein, the object is achieved by a method performed by a user equipment in a first set of user equipments served by a network node for applying a radio operation in a wireless telecommunications network. The user equipment receives at least one load indication for at least one PRR, wherein the at least one load indication indicates that a load on the at least one PRR is caused by cellular and/or D2D communications of a second set of user equipments served by at least one neighboring network node. The user equipments then applies one or more radio operation for cellular and/or D2D communications on the at least one PRR based on the at least one received load indication.

According to a sixth aspect of embodiments herein, the object is achieved by a user equipment in a first set of user equipments served by a network node for applying a radio operation in a wireless telecommunications network. The user equipment is configured to receive at least one load indication for at least one PRR, wherein the at least one load indication indicates that a load on the at least one PRR is caused by cellular and/or D2D communications of a second set of user equipments served by at least one neighboring network node. The user equipments is further configured to apply one or more radio operation for cellular and/or D2D communications on the at least one PRR based on the at least one received load indication.

By determining the load on a PRR caused by cellular and/or D2D communications of user equipments in a network node and transmitting this load information to a neighboring network node and/or to a user equipment via the neighboring network node, the neighboring network node is enabled to jointly schedule cellular and D2D communications of user equipments in view of both intra- and intercell interference and/or the user equipment is enabled to apply one or more radio operations for cellular and/or D2D communications in view of both intra- and intercell interference.

This provides for a way of limiting the effects of sharing radio resources, i.e. using the same or overlapping PRRs, for cellular and D2D communications of user equipments in a wireless telecommunications network.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 5 is a further schematic table of some embodiments of methods in network nodes and user equipments.

FIG. 6 is yet a further schematic table of some embodiments of methods in network nodes and user equipments.

DETAILED DESCRIPTION

Figure 1:
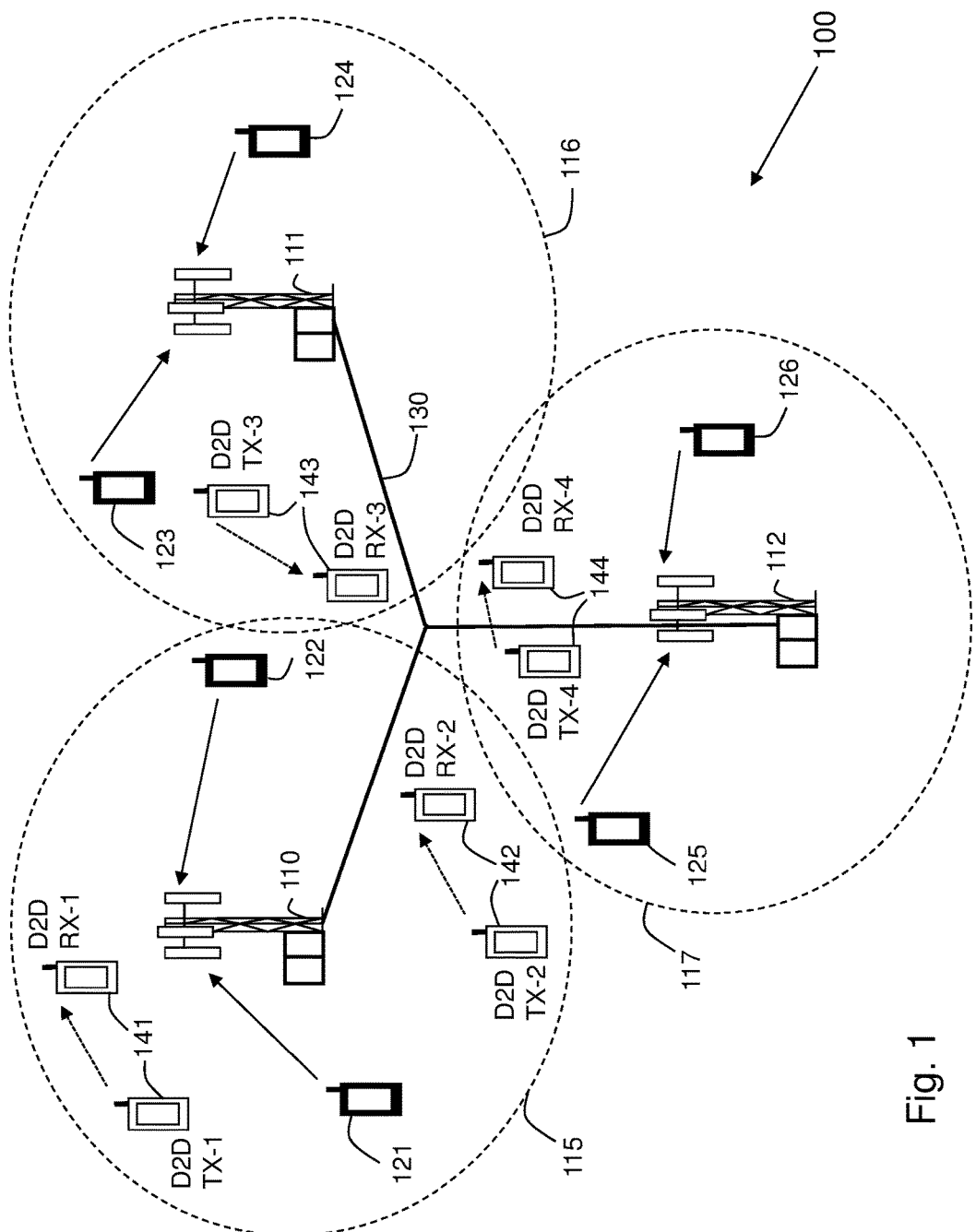
FIG. 1 is a schematic block diagram illustrating embodiments in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless telecommunications network 100 in which embodiments herein may be implemented. In some embodiments, the wireless telecommunications network 100 may be a wireless communication network such as an LTE, LTE Advanced or any future 3GPP cellular network, or any other cellular network or system, in which both MIMO and D2D communications are supported in its cellular spectrum.

The wireless telecommunications system 100 comprises a network node 110. The network node 110 serves a cell 115. The network node 110 may e.g. be an eNB, eNodeB, or a Home Node B, a Home eNode B, femto Base Station (BS), pico BS or any other network unit capable to serve a user equipment or a machine type communication device in the wireless communications system 100. The network node may also be e.g. a base station controller, a network controller, a relay node, a repeater, an access point, a radio access point, a Remote Radio Unit (RRU) or a Remote Radio Head (RRH). The network node 110 is configured to support both MIMO and D2D communications in the cell 115.

In FIG. 1, a number of user equipments 121, 122, 141, 142 are located within the cell 115. The user equipments 121, 122, 141, 142 are configured to communicate within the wireless telecommunications network 100 via the network node 110 over a radio link when present in the cell 115 served by the network node 110. Some of the user equipments 121, 122, 141, 142 in the cell 115 may also be capable of communicating directly with other user equipments using wireless D2D communication over direct D2D links, rather than via the network node 110.

Each of the number of user equipments, UEs, may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device or Machine to Machine (M2M) device, a UE with D2D capability, Customer Premises Equipment (CPE), etc.

In the exemplified scenario of FIG. 1, a first and second user equipment 121 and 122 are located within the cell 115. The first and second user equipment 121 and 122 communicate with the network node 110 using conventional cellular communication.

The first and second user equipment 121 and 122 may e.g. be Multiple User-MIMO, MU-MIMO, compatible user equipments. This means that the first and the second user equipment 121 and 122 may share the same radio resource, i.e. Physical Radio Resource, PRR, in the cellular spectrum in the cell 115. This is because the network node 110 may use interference cancellation capabilities of its MIMO capable receivers and the spatial separation of the first and the second user equipment 121 and 122 to distinguish multiple transmissions and spatial streams received from the first and the second user equipment 121 and 122.

Further, in this exemplified scenario, a first and a second D2D pair of user equipments 141 and 142 are also located in the cell 115. The first and second D2D pair may communicate in the cellular spectrum in the cell 115 using a direct D2D link. The radio resource in the cellular spectrum in the cell 115 used by these D2D communications may at least partly overlap with the radio resources used by the cellular communications of the first and second user equipment 121 and 122.

It should also be noted that a large number of user equipments may be located in the cell 115 of the network node 110, but for the sake of simplicity the embodiments is described herein with reference to the scenario in FIG. 1. Thus, the first and second user equipments 121, 122 may be seen as two user equipments among more user equipments communicating with the network node 110 using conventional cellular communication. Also, the first and second D2D pair of user equipments 123, 124 may be seen as two D2D pairs of user equipments among more D2D pairs of user equipments located in the cell 115 of the network node 110.

Here, it may also be assumed that the first and second D2D pair 123 and 124 may use UL radio resources in the wireless communications network 100 in their D2D communications, i.e. UL PRRs. However, it should be noted that is also possible for the first and second D2D pair 123 and 124 to use DL radio resources in the wireless communications network 100 in their D2D communications, i.e. DL PRRs.

In FIG. 1, the same capabilities and scenario as described for the network node 110, also applies to respective network node 111 and 112.

The network node 111 serves a cell 116, and is configured to support both MIMO and D2D communications in the cell 116. A third and fourth user equipment 123 and 124 may e.g. be Multiple User-MIMO, MU-MIMO, compatible user equipments located in the cell 116. Further, a third D2D pair of user equipments 143 is also located in the cell 116, which may communicate in the cellular spectrum in the cell 116 using a direct D2D link. Similarly, the network node 112 serves a cell 117, and is configured to support both MIMO and D2D communications in the cell 117. A fifth and sixth user equipment 125 and 126 may e.g. be Multiple User-MIMO, MU-MIMO, compatible user equipments located in the cell 117. Further, a fourth D2D pair of user equipments 144 is also located in the cell 117, which may communicate in the cellular spectrum in the cell 117 using a direct D2D link.

The network nodes 110, 111, 112 may be connected and configured to communicate with each other over the connection 130 using, for example, an X2 signalling interface.

As a consequence of having the first and second D2D pair 141 and 142 using UL radio resources for the direct D2D link in cell 115 served by the network node 110, the following intra-cell interference situations may, for example, arise:

First, cellular transmission from the first and second user equipments 121 and 122 to the network node 110 may cause interference to the receiving user equipments, D2D RX 1 and D2D RX 2, of the first and second D2D pairs 141 and 142.

Secondly, D2D transmissions from the transmitting user equipment, D2D TX 1 and D2D TX 2, of the first and second D2D pair 141 and 142 may cause interference to the receiving user equipments, D2D RX 1 and D2D RX 2, of the first and second D2D pair 123 and 124.

Thirdly, D2D transmissions from the transmitting user equipment, D2D TX 1 and D2D TX 2, of the first and second D2D pair 141 and 142 may cause interference to the network node 110 when e.g. receiving cellular transmissions from the first and second user equipments 121 and 122.

Corresponding intra-cell interference scenarios may arise in cell 116, 117 served by the network node 111, 112, respectively, for the user equipments 123, 124, 143 and 125, 126, 144 located therein.

In order to handle these interferences in the user equipments, the receiving user equipments, e.g. D2D RX 1 and D2D RX 2 of the first and second D2D pairs 141 and 142, D2D RX3 of the third D2D pair 143 and D2D RX4 of the third D2D pair 144, may be configured to perform linear interference suppressing via e.g. a Minimum Mean Square Error, MMSE receiver, or non-linear subtractive-type of interference cancellation via e.g. a Minimum Mean Square Error-Successive Interference Cancellation, MMSE-SIC, receiver.

In order to handle these interferences in the network nodes, the network nodes 110, 111, 112 may be configured to use one of the following: a MMSE-Maximum Ratio Combining, MMSE-MRC, receiver; a MMSE-Interference Rejection Combining, MMSE-IRC, receiver; a pre-decoding based SIC receiver; or a Post-decoding based SIC receiver.

Considering the exemplified scenario in FIG. 1 as described above, the network node 110 must determine which user equipments communicating using cellular communication, e.g. the first and second user equipments 121 and 122, and which user equipments communicating using D2D communication, e.g. the first and second D2D pair 123 and 124, should be scheduled using the same or overlapping radio resources, i.e. the same or overlapping Physical Radio Resource, PRR. While the cellular spectrum efficiency increases with the number of user equipments communicating using cellular communication and user equipments communicating using D2D communication, i.e. the number of MU-MIMO and D2D users, that are scheduled on the same or overlapping radio resources, i.e. PRRs, the interference will also increase. This is true for both intra-cell interference as described above and inter-cell interference as described below.

Thus, in multi-cell systems, both intra- and intercell interference needs to be properly managed.

For the exemplified scenario in FIG. 1, the following inter-cell interference situations may, for example, arise:

First, cellular transmission from the fifth user equipment 125 in the cell 117 to the network node 112 may cause interference to the receiving user equipment D2D RX 2 of the second D2D pair 142 in cell 115.

Secondly, D2D transmissions from the transmitting user equipment D2D TX 4 of the fourth D2D pair 144 in the cell 117 may cause interference to the receiving user equipments, D2D RX 2 and D2D RX 3, of the first and second D2D pair 142 and 143 in cells 115 and 116, respectively.

The issue of inter-cell interference, such as exemplified above, needs to be addressed or it may otherwise lead to severe interference increases, spectral efficiency and capacity degradation and end-user Quality-of-Service, QoS, problems.

This issue is addressed by embodiments described herein by having the network node (e.g. network node 110) determining the load on a PRR caused by cellular and/or D2D communications (e.g. scheduled MU MIMO and/or D2D users, scheduled number of spatial streams and/or level of interference experienced on the PRR) of user equipments (e.g. the user equipments 122, 121, 141, 142) and transmitting this load information to a neighboring network node (e.g. network node 112) and/or to a user equipment (e.g. user equipments 125, 126, 144) via the neighboring network node, the neighboring network node (e.g. network node 112) is enabled to jointly schedule cellular and/or D2D communications of user equipments (e.g. user equipments 125, 126, 144) in view of both intra- and intercell interference and/or the user equipment (e.g. user equipments 125, 126, 144) is enabled to apply one or more radio operations for cellular and/or D2D communications in view of both intra- and intercell interference.

This provides for a way of limiting the effects of sharing radio resources, i.e. using the same or overlapping PRRs, for cellular and/or D2D communications of user equipments in a wireless telecommunications network.

Embodiments are exemplified and explained in more detail below with reference to the exemplified scenario in FIG. 1.

Figures 2, 3, 4:
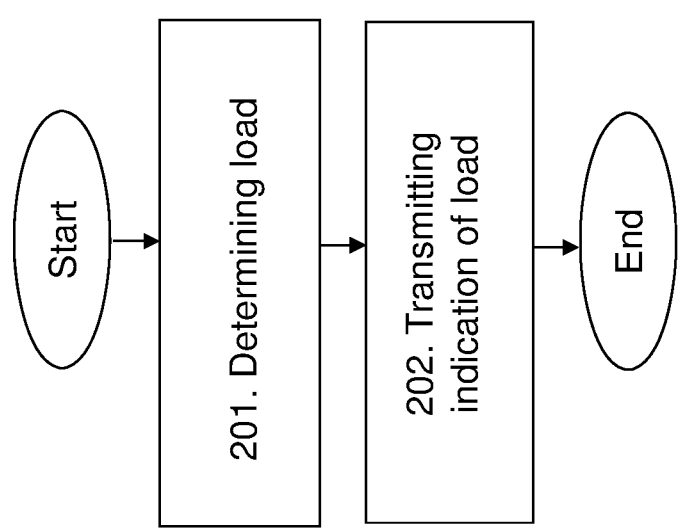
FIG. 2 is a flowchart depicting embodiments of a method in a network node.
FIG. 3 is a schematic table of some embodiments of methods in network nodes and user equipments.
FIG. 4 is another schematic table of some embodiments of methods in network nodes and user equipments.

Example of embodiments of a method performed by a network node 110 for assisting cellular communications and D2D communications of a first set of user equipments 123, 124, 125, 126, 143, 144 served by at least one neighboring network node 111, 112 in a wireless telecommunications network 100, will now be described with reference to a flowchart depicted in FIG. 2. FIG. 2 is an illustrated example of exemplary actions or operations which may be taken by the network node 110. The method may comprise the following actions.

Action 201

In this action, the network node 110 determines a load on at least one Physical Radio Resource, PRR, which PRR is assigned to a second set of user equipments 121, 122, 141, 142 served by the network node 110 for cellular and/or D2D communications. This enables the network node 110 to compile and transmit an indication or indicator, e.g. a message or an information element, of the determined load on the at least on PRR which is caused by cellular and/or D2D communications of the second set of user equipments 121, 122, 141, 142. Also, here, the cellular and/or D2D communications may occur simultaneously on the at least one PRR, e.g. in the same TTI.

It should be noted that the determination in this Action 201, and the subsequent transmission in Action 202, may be performed by the network node 110 periodically. This may provide a more proactive solution. Alternatively, these may also be performed by the network node 110 in response to an event, i.e. be triggered by an event. This may provide a more reactive solution. One example of an event may be when the network node 110 accepts a new cell-edge D2D pair of user equipments on a PRR. Another option is a combination of periodical and event-based triggering. For example, a periodical triggering may be used during data traffic peak hours, while event-based triggering is used at other times.

In some embodiments, the determining of the load on the at least one PRR is further based on mobility measurement reports of the user equipments in the second set of user equipments 121, 122, 141, 142. As the network node 110 continuously evaluates measurement reports from the user equipments in the second set of user equipments 121, 122, 141, 142, this may also be events that may trigger the determination the load and transmission of the load indication to the at least one neighboring network nodes 111, 112; that is, for example, interference experienced by D2D receivers of user equipments in the second set of user equipments 121, 122, 141, 142 or the network node 110 may be used as triggering events or triggers.

In some embodiments, the determining of the load on the at least one PRR is performed by the network node 110 for user equipments among the second set of user equipments 121, 122, 141, 142 depending on upon their location with respect to the location of the network node 110 and/or with respect to the location of the at least one neighboring network node 111, 112. This means that the network node 110 may optionally exclude those user equipments using cellular communications, e.g. some of the user equipments 121, 122 or MIMO users in cell 115, and/or user equipments using D2D communications, e.g. some of the first and second D2D pair 141, 142 or D2D users in cell 115, that are within a cell centre area.

In some embodiments, the determining of the load on the at least one PRR is performed by the network node 110 specifically for each of the at least one neighboring network node 111, 112 and only for the at least one PRR that is determined to be relevant for each specific one of the at least one neighboring network node 111, 112, respectively. This enables the network node 110 to transmit specific load indications that are relevant to each specific one of the at least one neighboring network node 111, 112, to each specific one of the at least one neighboring network node 111, 112.

Action 202

After determining the load on the at least one PRR, the network node 110 transmits an indication of the load to the at least one neighboring network node 111, 112. This load indication further indicates to the at least one neighboring network node 111, 112 that the load on the at least one PRR is caused by cellular and/or D2D communications of the second set of user equipments 121, 122, 141, 142 served by the network node 110. This will thus allow the at least one neighboring network node 111, 112 to jointly schedule cellular and/or D2D communications of at least some user equipments in the cells 116-117, e.g. the first set of user equipments 123, 124, 125, 126, 143, 144, on specific PRRs in view of the inter-cell interference caused by at least some user equipments in the cell 115, e.g. the second set of user equipments 121, 122, 141, 142, on said specific PRRs.

It should be noted that the load on the at least one PRR may be experienced by the network node 110 and/or the user equipments in the second set of user equipments 121, 122, 141, 142. Also, the D2D communications may in this case also refer to D2D discovery, D2D bearer establishment, D2D broadcast signalling, D2D transmissions, etc.

The indication of the load, i.e. load indication comprising inter-cell interference information, may be created and signaled by the network node 110 to the at least one neighboring network node 111, 112 by using a message or an Information Element, IE. Examples of such messages or information elements are herein referred to as D2D-MIMO Load Indication, DMLI, and are described in more detailed below with reference to FIGS. 3-6. The receipt of this message or IE may in itself be an indication to the neighboring network node and/or user equipment that there is a load on the at least one PRR.

In some embodiments, the load indication may further indicate that the second set of user equipments 121, 122, 141, 142 is scheduled on the at least one PRR for cellular and D2D communications simultaneously. Scheduling is performed on the at least one PRR when the network node 110 and/or the user equipments in the second set of user equipments 121, 122, 141, 142 has data to transmit. However, as indicated above, the at least one PRR may be assigned or reserved to the user equipments in the second set of user equipments 121, 122, 141, 142 even when before there is data to send. Also, for the user equipments in the D2D pairs 141, 142, the actual scheduling may be performed by user equipments themselves, e.g. on PRRs configured by the network node 110.

In some embodiments, at least the cellular communications of the second set of user equipments 121, 122, 141, 142 involves at least two spatial streams. Also, in some embodiments, the cellular communications of the second set of user equipments 121, 122, 141, 142 is a MIMO communication, i.e. a Multi-User Multiple-Input-Multiple-Output, MU-MIMO, cellular communications and/or Single-User Multiple-Input-Multiple-Output, SU MIMO, cellular communications. It should here be noted that the term MU MIMO could in some cases be said to comprise the single user MIMO as a special case when the number of users scheduled on a PRR degenerates to 1.

In some embodiments, the load indication may be determined, i.e. derived from, based on one or more of:

the number of user equipments in the second set of user equipments 121, 122, 141, 142 that is assigned to, or scheduled on, the at least one PRR for cellular communications, the total number of spatial streams used by the user equipments in the second set of user equipments 121, 122, 141, 142 for cellular communications on the at least one PRR, the number of user equipments in the second set of user equipments 121, 122, 141, 142 that is assigned to, or scheduled on, the at least one PRR for D2D communications, the total number of spatial streams used by the user equipments in the second set of user equipments 121, 122, 141, 142 for D2D communications on the at least one PRR, and whether spatial streams are orthogonal or shared between the user equipments in the second set of user equipments 121, 122, 141, 142 for cellular and D2D communications.

This inter-cell interference information associated with the at least one PRR may thus be comprised in or inferred by the transmitted load indication.

In some embodiments, the load indication may be an interference overload indication for the at least one PRR. Here, the indication of the load, i.e. load indication comprising inter-cell interference information, may be signaled by the network node 110 to the at least one neighboring network node 111, 112 by using a message or an information element, which herein may be referred to as a D2D-MIMO Overload Indication, DMOI. An example of a DMOI is described in more detailed below with reference to FIG. 6.

Thus, the network node 110 may use the interference overload indication, e.g. DMOI, to selectively indicate to the at least one neighboring network nodes 111, 112 when user equipments using cellular communications, e.g. user equipments 121, 122 or MIMO users in cell 115, and/or user equipments using D2D communications, e.g. the first and second D2D pair 141, 142 or D2D users in cell 115, which uses the at least one PRR are experiencing a high interference.

In some embodiments, when the load on the at least one PRR has been determined by the network node 110 specifically for each of the at least one neighboring network node 111, 112 and only for the at least one PRR that is determined to be relevant for each specific one of the at least one neighboring network node 111, 112, the network node 110 may transmit the specific indications to each specific one of the at least one neighboring network node 111, 112.

For example, with the definition of the load indication, such as, e.g. the DMLI as shown in FIGS. 3-6 below, allows the network node 110 to send neighbour-specific DMLIs rather than sending the same DMLI contents to all of its neighboring network nodes 111, 112. More specifically, in some embodiments, the network node 110 may create and transmit cell-specific DMLIs, e.g. DMLI-1 and DMLI-2, to each of the network node 111 and network node 112, respectively. To achieve this, the network node 110 may primarily take into account the interference on the at least one PRR of those user equipments which are closer to each of the victim neighboring cell(s), e.g. user equipment 122 for the neighboring cell 116 served by the network node 111 and the second D2D pair of user equipments 142 for the neighboring cell 117 served by the network node 111.

In more detail, since user equipment 122 using MU-MIMO mode is near the cell border of the neighboring cell 116 served by the network node 111 but far away from the border of neighboring cell 117 served by the network node 112, information specific to the transmissions of user equipment 122 may be comprised in the DMLI that the network node 110 sends to network node 111. However, this information will not be comprised in the DMLI that the network node 110 sends to the network node 112. The same, but vice versa, applies to transmissions of specific DMLIs for the second D2D pair of user equipments 142 towards the neighboring cell 117 served by the network node 111.

Furthermore, since the user equipments 121, 141 are far away from the cell boarders of both cells 116, 117, information specific to the transmissions of the user equipments 121, 141 may not be comprised in the DMLI that the network node 110 sends to either of the network nodes 111, 112.

In order to facilitate this specific DMLI signalling between the neighboring network node 110, the user equipments 121, 122, 141, 142 may assist the serving network node 110 by reporting their radio measurements, such as, e.g. Reference Signal Received Power, RSRP, Reference Signal Received Quality, RSRQ, etc, from cells 116, 117 served by the neighboring network nodes 111, 112.

These radio measurement reports may be similar or even identical to existing mobility (handover) related measurements. Alternatively, the specific radio measurement reporting details may be configured by the serving network node 110 to assist the specific DMLI reporting to neighboring cells.

The network node 110 may also acquire additional information, such as, e.g. the location of user equipments. This will allow the network node 110 to determine the user equipments' position relative to the neighboring cells 116, 117 for which these user equipments are expected to cause more significant interference. The network node 110 may use both user equipments radio measurements and the user equipments' location to more precisely determine the most dominant inter-cell interfering user equipments towards each of the neighboring cells 116, 117. The network node 110 may then use this information to derive the cell-specific DMLIs for the neighboring cells 116, 117 and eventually signal the derived DMLIs to the respective network nodes 111, 112. The neighboring network nodes 111, 112 may use the received cell-specific DMLIs for radio operations, such as, for example, scheduling or assigning of PRRs, selection of transport format, adjustment of transmit powers, etc.

It should also be noted that the load indication may be determined by the network node 110 for the cellular communications and/or D2D communications of the second set of user equipments 121, 122, 141, 142 performed on an uplink PRR, UL PRR, or on an downlink PRR, DL PRR.

FIGS. 3-6 shows schematic tables of some examples of load indications, herein referred to as D2D-MIMO Load Indications, DMLIs, which may be used in some embodiments of the methods in the network nodes 110, 111, 112 and user equipments 121, 122, 123, 124, 125, 126, 141, 142, 143, 144 herein.

The structure of the DMLI may be determined beforehand, i.e. pre-defined, to enable a receiver to interpret its meaning. This means that, for example, the Operation and Maintenance, OAM, which may be specified in the standard, may determine or predefine the meaning of the DMLI such that the receiving end, e.g. at least one neighboring network node 111, 112 and/or user equipment 121, 122, 123, 124, 125, 126, 141, 142, 143, 144 as will be described in more detail below, may readily interpret the DMLI. The DMLI may be created and sent by the network node 110 either separately for UL and DL PRRs, or as indicative of the overall UL/DL radio resource situation.

According to one example, the network node 110 may create and send the DMLI as a 2-level indicator. In this case, the DMLI may indicate whether the at least one PRR is currently shared by both MIMO and D2D users or not, that is, user equipments using cellular communications (e.g. user equipments 121, 122, i.e. MIMO users in cell 115) and user equipments using D2D communications (e.g. the first and second D2D pair 141, 142, i.e. D2D users in cell 115) or not. This is shown in the table of FIG. 3.

According to another example, the network node 110 may create and send the DMLI as a 4-level indicator. In this case, the DMLI may indicate whether the at least one PRR is currently is used by MIMO users, D2D users or both, that is, user equipments using cellular communications (e.g. user equipments 121, 122, i.e. MIMO users in cell 115), user equipments using D2D communications (e.g. the first and second D2D pair 141, 142, i.e. D2D users in cell 115) or both. This is shown in the table of FIG. 4.

According to a further example, the network node 110 may create and send the DMLI as a 5-level indicator. In this case, the DMLI may indicate whether the at least one PRR is currently is used by MIMO users, D2D users, both MIMO and D2D users, as well as, whether all streams are shared (i.e. use the same set of pre-coding matrices) or not (i.e. using orthogonal pre-coding matrices). This is shown in the table of FIG. 5.

It should here be noted that the receipt of the DMLI may in itself be an indication to the neighboring network node and/or user equipment that there is a load on the at least one PRR.

According to yet another example, the network node 110 may create and send the DMLI or DMOI so as to indicate discrete levels of load of the MIMO and D2D users on the at least one PRR. This is shown in the table of FIG. 6.

Figures 7, 8:
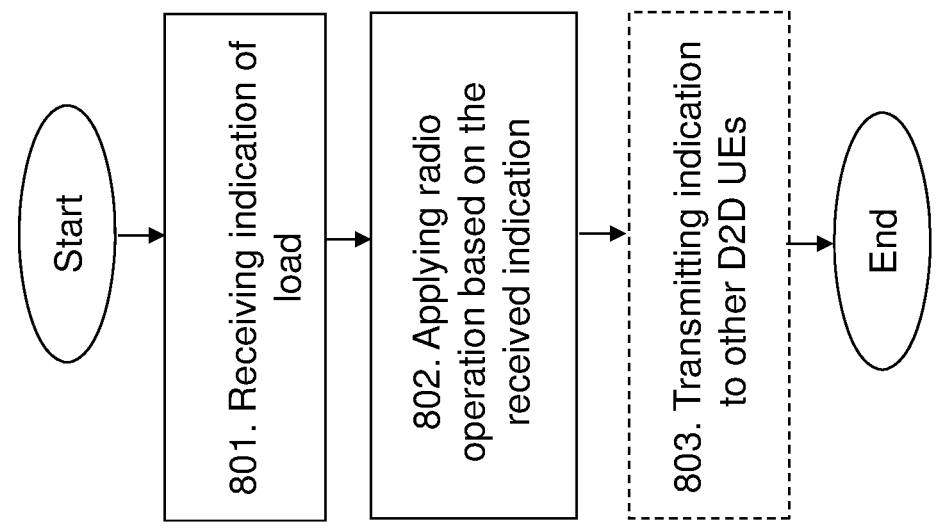
FIG. 7 is another flowchart depicting embodiments of a method in a network node.
FIG. 8 is a flowchart depicting embodiments of a method in a user equipment.

Example of embodiments of a method performed by a network node 111, 112 for handling cellular communications and D2D communications of a first set of user equipments 123, 124, 125, 143, 144 served by the network node 111, 112 in a wireless telecommunications network 100, will now be described with reference to a flowchart depicted in FIG. 7. FIG. 7 is an illustrated example of exemplary actions or operations which may be taken by the network node 111, 112. The method may comprise the following actions.

Action 701

In this action, the network node 111, 112 receives, from at least one neighboring network node 110, at least one load indication for at least one Physical Radio Resource, PRR, wherein the at least one load indication indicates that a load on the at least one PRR is caused by cellular and/or D2D communications of a second set of user equipments 121, 122, 141, 142 served by the at least one neighboring network node 110. This enables the network node 111, 112 to adjust its scheduling decisions and radio transmissions on certain PRRs in a way such that the network node 111, 112 takes into account the received inter-cell interference information of the load indication.

Specifically, the network node 111, 112 is enabled to estimate the number of spatial streams on each PRR that the network node 111, 112 can handle depending on its available Degree of Freedom, DoF, and take into account the number of spatial interfering inter-cell streams that are used on each PRR, e.g. for cellular and/or D2D communications of the second set of user equipments 121, 122, 141, 142 in the neighboring cell 115 served by the network node 110.

Action 702

After receiving the load indication, the network node 111, 112 schedules at least one of cellular and D2D communications of the user equipments in the first set of user equipments 123, 124, 125, 143, 144 on the at least one PRR based on the at least one received load indication. In this way, the network node 111, 112 adjusts its scheduling decisions and radio transmissions on certain PRRs in a way such that the network node 111, 112 takes into account the received inter-cell interference information of the load indication, e.g. DMLI.

In some embodiments, the load indication may further indicate that the second set of user equipments 121, 122, 141, 142 is scheduled on the at least one PRR for cellular and D2D communications simultaneously. In some embodiments, at least the cellular communications of the second set of user equipments 121, 122, 141, 142 involves at least two spatial streams. Also, in some embodiments, the cellular communications of the second set of user equipments 121, 122, 141, 142 is one of MU-MIMO cellular communications and/or SU MIMO cellular communications.

Thus, in some embodiments, the network node 111, 112 may schedule at least one of cellular and D2D communications of the user equipments 123, 124, 125, 143, 144 on the at least one PRR by adjusting the number of spatial streams used by the cellular and/or D2D communications of the user equipments in the first set of user equipments 123, 124, 125, 143, 144 on the at least one PRR at least partly based on the at least one received load indication.

Furthermore, in some embodiments, the network node 111, 112 may schedule at least one of cellular and D2D communications of the user equipments 123, 124, 125, 143, 144 on the at least one PRR by adjusting one or more of:
  the number of user equipments in the first set of user equipments 123, 124, 125, 143, 144 using the at least one PRR,
  the transmit power levels of the cellular and D2D communications used by the user equipments in the first set of user equipments 123, 124, 125, 143, 144 on the at least one PRR,
  the transport format of the cellular and D2D communications used by the user equipments in the first set of user equipments 123, 124, 125, 143,144 on the at least one PRR,
  the precoding matrices of the cellular and D2D communications of the user equipments in the first set of user equipments 123, 124, 125, 143,144 assigned to the at least one PRR, and/or
  data rate of the cellular and D2D communications of the user equipments in the first set of user equipments 123, 124, 125, 143,144 assigned to the at least one PRR,
at least partly based on the at least one received load indication, e.g. DMLI.

In one example, in response to the received load indication (DMLI/DMOI), the network node 111, 112 may avoid scheduling MU-MIMO or D2D users, for example, user equipments using cellular communications (e.g. user equipments 123, 124, 125, i.e. MIMO users in cells 116-117), user equipments using D2D communications (e.g. the third and fourth D2D pair 143, 144, i.e. D2D users in cells 116-117), that would exceed the available DoF of the network nodes 111, 112. This may also be determined depending on the UL receiver structure of the network nodes 111, 112 and currently ongoing number of streams in total, i.e. for both MU MIMO and D2D communications.

In another example, in response to the received load indication (DMLI/DMOI), the network node 111, 112 may reduce the transmission power of the user equipments using D2D communications or D2D Tx power (e.g. the transmission power of the third and fourth D2D pair 143, 144), or reduce the transmission power of the user equipments using cellular communications or MU-MIMO UL transmit power (e.g. the transmission power of the user equipments 123, 124, 125). This may, in some cases, be performed in combination with reducing the number of spatial streams and/or selecting a more robust transport format.

In yet another example, the network node 110 may use the received load indication (DMLI/DMOI) for interference mitigation in that it may adapt the number of D2D and/or MIMO users and the corresponding streams on the at least one PRR depending upon the value of a function f(DMLI) on that at least one PRR. For example, if the network node 111, 112 receives from the neighboring network node 110 a load indication indicating DMLI=2, according to e.g. the table in FIG. 4, for one or more PRRs, then the network node 111, 112 may schedule only D2D users (e.g. the third and fourth D2D pair 143, 144, i.e. D2D users in cells 116-117) and no MIMO users (e.g. user equipments 123, 124, 125, i.e. MIMO users in cells 116-117) on these PRRs, or vice versa.

In a further example, the network node 111, 112 may use DMLIs received from one or more neighboring nodes 110. The network node 111, 112 may use a suitable function for deriving a common DMLI value (C-DMLI), which also may be referred to as a composite or aggregated DMLI value, from the multiple DMLIs received from different neighboring network nodes 110. Examples of such suitable functions may be maximum value selection, average value selection, sum value selection, selection according to the majority of values, etc. For example, assuming a 4-level DMLI according to e.g. the table in FIG. 4, if DMLIs received in network node 111 from network node 110 and network node 112 are 1 and 3, respectively, then by using e.g. the maximum value selection function, the network node 111 may assume an common DMLI=3 for performing radio operation tasks. The function for deriving the common DMLI may also be determined or pre-defined by a standard.

It should also be noted that the network node 111, 112 may also take into account other type of radio related information along with the DMLI when assigning PRRs to its own MU MIMO and D2D users. For example, the network node 111, 112 may take into account one or more of the average user equipment transmit powers in the cell, DL signal quality (e.g. DL path loss, RSRP, RSRQ, CSI, SNR, SINR, BLER, etc.), UL signal quality (e.g. UL path loss, UL SNR, SINR, BLER, etc.), received interference at its own receiver and/or receivers of neighboring network nodes 110.

It may further be noted that the network node 111, 112 may maintain a so-called Scheduling Table, ST, which may comprise the inter-cell interference information obtained by the network node 111, 112 via the load indication, or DMLI/DMOI, from neighboring network nodes, e.g. network node 110. Each network node 110, 111, 112 may update the ST continuously. This may be performed similar as to a single cell case, but also comprised an update of the DMLI-part of the ST. The ST may also comprise information on what information has been sent to neighboring network nodes 110, 111, 112 via DMLI.

In some embodiments, the network node 111, 112 may schedule at least one of cellular and D2D communications of the user equipments in the first set of user equipments 123, 124, 125, 143, 144 on the at least one PRR such that the (intra-cell) interference caused by the user equipments in the first set of user equipments 123, 124, 125, 143, 144 served by the network node 111, 112 on the at least one PRR and the (inter-cell) interference caused by the user equipments in the second set of user equipments 121, 122, 141, 142 served by the at least one neighboring network node 110 on the at least one PRR is below an interference threshold value. This may ensure that the intra-cell interference, as well as, the inter-cell interference is kept below an acceptable limit.

In some embodiments, the network node 111, 112 may schedule at least one of cellular and D2D communications of the user equipments 123, 124, 125, 143, 144 on the at least one PRR by determining a D2D transmission mode for at least one pair of user equipments 143, 144 that is to be scheduled for D2D communication on the at least one PRR at least partly based on the at least one received load indication.

Conventionally, there are at least four (4) defined modes of cellular UE and D2D UE resource sharing. The network node 110 may determining a D2D transmission mode by performing a so called Mode Selection, MS. A part of the MS is the calculation of a Margin Value, MV. Here, this may performed differently from single cell interference management in that the load indication, e.g. DMLI/DMOI, may also be taken into account in the determination of the MV. Specifically, according to one example, the MV may be reduced to a value of f(DMLI). The f(DMLI) is a function of the received information on the DMLI. The f(DMLI) may be explained below with a few examples.

In one example, f(DMLI)=MV*(1−k/N), where k is received DMLI level from a neighboring node 110 and N is the number of determined, i.e. pre-defined, DMLI levels. Thus, for example, if DMLI is a 4-level load indication (i.e. N=4) and the received DMLI=3, then the effective MV may be reduced by 75%. However, if DMLI level=0, then MV may be unaffected.

In another example, f(DMLI)=MV*(1−(k*ai)/N), where ai is weighting factor for different DMLI levels. The values of ai may be, for example, smaller for larger DMLI levels. As an example, ai={0, 0.75, 0.5 and 0.25} for k={0, 1, 2, 3}, respectively.

In some embodiments, the at least one received load indication is an interference overload indication, e.g. DMOI, for the at least one PRR. In this case, the network node 111, 112 may attempt to reduce the power or the number of MU-MIMO and/or D2D users, i.e. user equipments using cellular communications (e.g. user equipments 123, 124, 125, i.e. MIMO users in cells 116-117) and/or user equipments using D2D communications (e.g. the third and fourth D2D pair 143, 144, i.e. D2D users in cells 116-117), and thereby reducing the total number of spatial streams scheduled on the at least one PRR that is indicated in the DMOI.

Action 703

In this optional action, the network node 111, 112 may transmit the at least one received load indication for the at least one PRR to at least one user equipment in the first set of user equipments 123, 124, 125, 143, 144. This may enable the at least one user equipment in the first set of user equipments 123, 124, 125, 143, 144 sharing at least one PRR to apply an autonomous interference mitigation technique.

Example of embodiments of a method performed by a user equipment in a first set of user equipments 123, 124, 125, 126, 143, 144 served by a network node 111, 112 for applying a radio operation in a wireless telecommunications network 100, will now be described with reference to a flowchart depicted in FIG. 8. FIG. 8 is an illustrated example of exemplary actions or operations which may be taken by one or more of the user equipments in the first set of user equipments 123, 124, 125, 126, 143, 144. The method may comprise the following actions.

Action 801

In this action, the user equipment in the first set of user equipments 123, 124, 125, 126, 143, 144 receive at least one load indication for at least one PRR, wherein the at least one load indication indicates that a load on the at least one PRR is caused by cellular and/or D2D communications of a second set of user equipments 121, 122, 141, 142 served by at least one neighboring network node 110. This enables the user equipment in the first set of user equipments 123, 124, 125, 126, 143, 144 to apply autonomous interference mitigation techniques taking inter-cell interference into account.

In some embodiments, the user equipment in the first set of user equipments 123, 124, 125, 126, 143, 144 may receive several load indications from its serving network node 111, 112 associated with two or more neighboring network nodes, such as, e.g. network node 110. These several load indications may all be used when applying an autonomous interference mitigation techniques taking inter-cell interference into account. Alternatively, the user equipment in the first set of user equipments 123, 124, 125, 126, 143, may receive a common load indication, i.e. a composite DMLI (C-DMLI).

In some embodiments, the at least one received load indication indicates that the second set of user equipments 121, 122, 141, 142 are scheduled on the at least one PRR for cellular and D2D communications simultaneously. In some embodiments, the at least one received load indication is received by the user equipment in the first set of user equipments 123, 124, 125, 126, 143, 144 when at least the cellular communication of the second set of user equipments 121, 122, 141, 142 involves at least two spatial streams.

Furthermore, in some embodiments, the user equipment in the first set of user equipments 123, 124, 125, 126, 143, 144 may receive at least a second load indication for the at least one PRR. Here, the second load indication may indicate that a load on the at least one PRR is caused by cellular and/or D2D communications of user equipments in the first set of user equipments 123, 124, 125, 126, 143, 144 served by the serving network node 111, 112 of the user equipment in a first set of user equipments 123, 124, 125, 126, 143, 144, that is, caused by other user equipments in the first set of user equipments 123, 124, 125, 126, 143, 144. In this case, the user equipment in the first set of user equipments 123, 124, 125, 126, 143, 144 may also apply one or more radio operation for cellular and/or D2D communications on the at least one PRR based on the at least one received load indication and the second received load indication.

This allows the user equipment in the first set of user equipments 123, 124, 125, 126, 143, 144 to use both the load on the at least one PRR in neighboring cell(s) 110 and the serving cell 111, 112 for applying a radio operation. Hence, both these load indications may be comprised e.g. a standard element comprising DMLIs/DMOIs.

Action 802

After receiving the at least one load indication for the at least one PRR, the user equipment in the first set of user equipments 123, 124, 125, 126, 143, 144 apply one or more radio operation for cellular and/or D2D communications on the at least one PRR based on the at least one received load indication.

In some embodiments, the radio operations comprise one or more of: adjusting the number of the spatial streams that is used by its cellular and/or D2D communications, adjusting its transmit power of cellular and/or D2D communications, adjusting the transport format used by its cellular and/or D2D communications, adjusting the precoding matrices of its cellular and/or D2D communications, and adjusting the data rate of its cellular and/or D2D communications.

Furthermore, the user equipment in the first set of user equipments 123, 124, 125, 126, 143, 144 may react to these one or more load indications for the at least one PRR, e.g. DMLIs/DMOIs, differently depending on the radio measurements that the user equipment in the first set of user equipments 123, 124, 125, 126, 143, 144 obtains with respect to the neighboring network nodes from which the one or more load indications originated. For example, if the user equipment in the first set of user equipments 123, 124, 125, 126, 143, 144 has a radio measurement with respect to a neighboring cell, e.g. cell 115, that is lower than a certain threshold, the user equipment in the first set of user equipments 123, 124, 125, 126, 143, 144 may not necessarily change its current form of usage of the at least one PRR in terms of, for example, transmit power, data rate, or number of streams. However, if the user equipment in the first set of user equipments 123, 124, 125, 126, 143, 144 has a radio measurement with respect to a neighboring cell, e.g. cell 115, that is lower than a certain threshold, the user equipment in the first set of user equipments 123, 124, 125, 126, 143, 144 may change its current form of usage of the at least one PRR such as, for example, reducing its transmit power, data rate, and/or number of streams.

In some embodiments, when the received load indication is high, the user equipment in the first set of user equipments 123, 124, 125, 126, 143, may start using an Radio Frequency, RF, filter or other RF components, such as, e.g. an RF power amplifier, an antenna, etc., which may suppress or minimize or reduce out-of-band radio emission to other carriers more effectively. Alternatively, when the received load indication is high, the user equipment in the first set of user equipments 123, 124, 125, 126, 143, may autonomously reduce its transmit power by a certain amount, for example, below a determined or pre-defined threshold or by a threshold indicated by its serving network node 111, 112. Another example, when the received load indication is high, is that the user equipment in the first set of user equipments 123, 124, 125, 126, 143 may start using more advanced receiver(s), which may mitigate interference from other users and/or MIMO streams and/or from other cells by using neighboring cells' DMLIs or a C-DMLI.

Action 803

In this optional action, the user equipment in the first set of user equipments 123, 124, 125, 126, 143, 144 send the received load indication to one or more other D2D capable user equipments. This enables a user equipment to receive a load indication from the user equipment in the first set of user equipments 123, 124, 125, 126, 143, 144 when communicating with the user equipment in the first set of user equipments 123, 124, 125, 126, 143, 144 using D2D communication.

Figure 9:
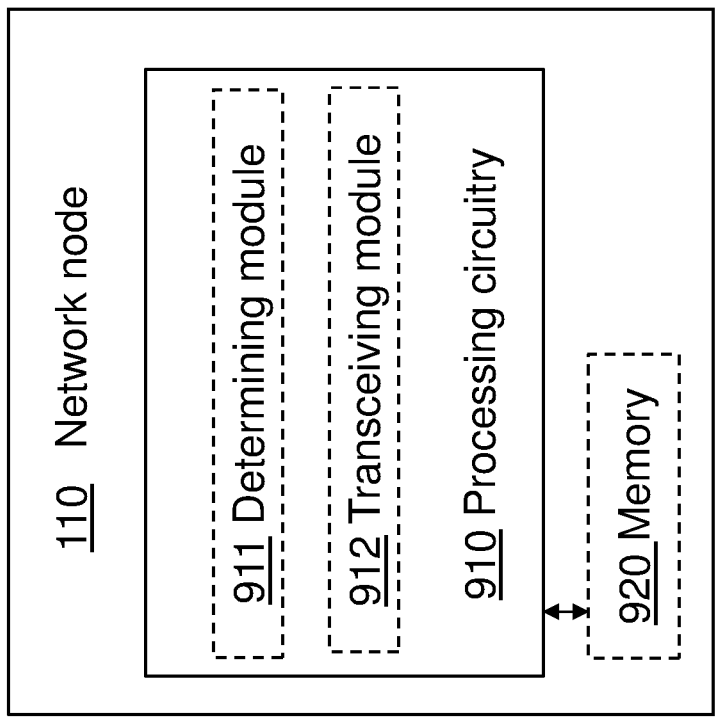
FIG. 9 is a block diagram depicting embodiments of a network node.

To perform the method actions in the network node 110 for assisting cellular communications and D2D communications of a first set of user equipments 123, 124, 125, 126, 143, 144 served by at least one neighboring network node 111, 112 in a wireless telecommunications network 100, the network node 110 may comprise the following arrangement depicted in FIG. 9.

FIG. 9 shows a schematic block diagram of embodiments of the network node 110. In some embodiments, the network node 110 may comprise a determining module 911 and a transceiving module 912. In some embodiments, the network node 110 may comprise a processing circuitry 910, which may also be referred to as processing module. The processing circuitry 910 may comprise one or more of the determining module 911 and the transceiving module 912, and perform the function thereof as described below.

The determining module 911 is configured to determine a load on at least one PRR, which at least one PRR is assigned to a second set of user equipments 121, 122, 141, 142 served by the network node 110 for cellular and/or D2D communications. The transceiving module 912 is configured to transmit an indication of the load to the at least one neighboring network node 111, 112, wherein the load indication further indicates that the load on the at least one PRR is caused by cellular and/or D2D communications of the second set of user equipments 121, 122, 141, 142 served by the network node 110.

In some embodiments, the load indication may further be determined by determining module 911 to indicate that the second set of user equipments 121, 122, 141, 142 are scheduled on the at least one PRR for cellular and D2D communications simultaneously. In some embodiments, at least the cellular communications of the second set of user equipments 121, 122, 141, 142 may involve at least two spatial streams.

In some embodiments, the cellular communications of the second set of user equipments 121, 122, 141, 142 may be a MIMO cellular communication, that is, Multi-User Multiple-Input-Multiple-Output, MU-MIMO, cellular communications and/or Single-User Multiple-Input-Multiple-Output, SU MIMO, cellular communications.

In some embodiments, the determining module 911 may be configured to determine the load indication based on one or more of: the number of user equipments in the second set of user equipments 121, 122, 141, 142 that is assigned to, or scheduled on, the at least one PRR for cellular communications, the total number of spatial streams used by the user equipments in the second set of user equipments 121, 122, 141, 142 for cellular communications on the at least one PRR, the number of user equipments in the second set of user equipments 121, 122, 141, 142 that is assigned to, or scheduled on, the at least one PRR for D2D communications, the total number of spatial streams used by the user equipments in the second set of user equipments 121, 122, 141, 142 for D2D communications on the at least one PRR, and whether spatial streams are orthogonal or shared between the user equipments in the second set of user equipments 121, 122, 141, 142 for cellular and D2D communications. In some embodiments, the load indication may be an interference overload indication for the at least one PRR.

In some embodiments, the determining module 911 may be configured to determine the load indication further based on mobility measurement reports of the user equipments in the second set of user equipments 121, 122, 141, 142. In some embodiments, the determining module 911 may be configured to determine the load indication for user equipments among the second set of user equipments 121, 122, 141, 142 depending on upon their location with respect to the location of the network node 110 and/or with respect to the location of the at least one neighboring network node 111, 112.

In some embodiments, In some embodiments, the determining module 911 may be configured to perform the determination specifically for each of the at least one neighboring network node 111, 112 and only for the at least one PRR that is determined to be relevant for each specific one of the at least one neighboring network node 111, 112, respectively. In this case, the transceiving module 912 may be configured to transmit specific indications to each specific one of the at least one neighboring network node 111, 112.

The embodiments for assisting cellular communications and D2D communications of a first set of user equipments 123, 124, 125, 126, 143, 144 served by at least one neighboring network node 111, 112 in a wireless telecommunications network 100 may be implemented through one or more processors, such as, e.g. the processing circuitry 910 in the network node 110 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 920, which may be referred to or comprise one or more memory modules or units. The memory 920 may be arranged to be used to store executable instructions and data, such as, e.g. D2D assistance information, to perform the methods described herein when being executed in the network node 110. Those skilled in the art will also appreciate that the processing circuitry 910 and the memory 920 described above may refer to a combination of analog and digital circuits, and/or one or more processors configured with software and/or firmware, e.g. stored in the memory 920, that when executed by the one or more processors such as the processing circuitry 910 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, a computer program, comprising instructions which, when executed on at least one processor, e.g. the processing circuitry or module 910, cause the at least one processor to carry out the method for assisting cellular communications and D2D communications of a first set of user equipments 123, 124, 125, 126, 143, 144 as described above is presented. Also, a carrier containing the computer program, wherein the carrier is one of an electronic signal, optical signal, radio signal, or computer readable storage medium, is presented.

Figure 10:
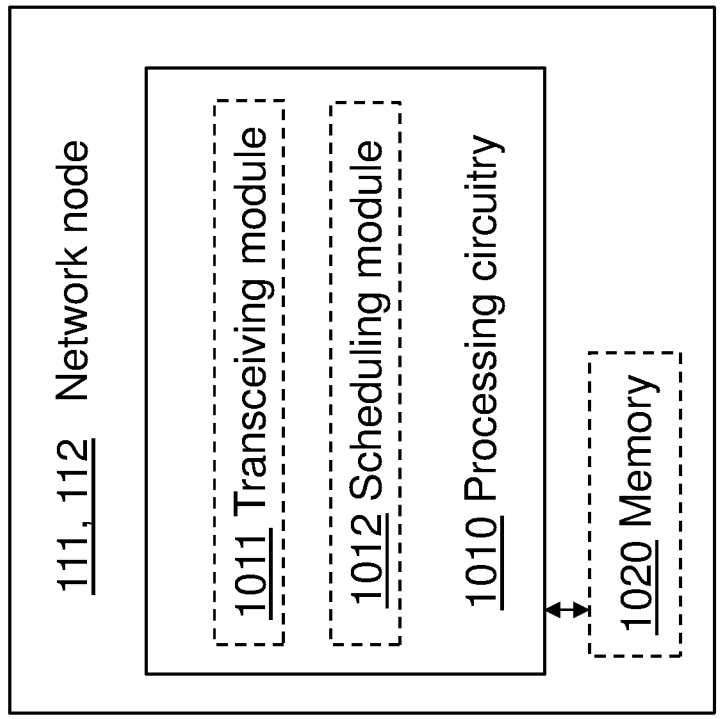
FIG. 10 is another block diagram depicting embodiments of a network node.

To perform the method actions in the network node 111, 112 for handling cellular communications and D2D communications of a first set of user equipments 123, 124, 125, 143, 144 served by the network node 111, 112 in a wireless telecommunications network 100, the network node 111, 112 may comprises the following arrangement depicted in FIG. 10.

FIG. 10 shows a schematic block diagram of embodiments of the network node 111, 112. In some embodiments, the network node 111, 112 may comprise a transceiving module 1011 and a scheduling module 1012. In some embodiments, the network node 111, 112 may comprise a processing circuitry 1010, which may also be referred to as processing module. The processing circuitry 1010 may comprise one or more of the transceiving module 1011 and the scheduling module 1012, and perform the function thereof described below.

The transceiving module 1011 is configured to receive, from at least one neighboring network node 110, at least one load indication for at least one PRR, wherein the at least one load indication indicates that a load on the at least one PRR is caused by cellular and/or D2D communications of a second set of user equipments 121, 122, 141, 142 served by the at least one neighboring network node 110. The scheduling module 1012 is configured to schedule at least one of cellular and D2D communications of the user equipments in the first set of user equipments 123, 124, 125, 143, 144 on the at least one PRR based on the at least one received load indication.

In some embodiments, the scheduling module 1012 may further be configured to adjust the number of spatial streams used by the cellular and/or D2D communications of the user equipments in the first set of user equipments 123, 124, 125, 143, 144 on the at least one PRR at least partly based on the at least one received load indication.

In some embodiments, the scheduling module 1012 may further be configured to adjust one or more of: the number of user equipments in the first set of user equipments 123, 124, 125, 143, 144 using the at least one PRR, the transmit power levels of the cellular and D2D communications used by the user equipments in the first set of user equipments 123, 124, 125, 143, 144 on the at least one PRR, the transport format of the cellular and D2D communications used by the user equipments in the first set of user equipments 123, 124, 125, 143,144 on the at least one PRR, the precoding matrices of the cellular and D2D communications of the user equipments in the first set of user equipments 123, 124, 125, 143,144 assigned to the at least one PRR, and/or the data rate of the cellular and D2D communications of the user equipments in the first set of user equipments 123, 124, 125, 143,144 assigned to the at least one PRR, at least partly based on the at least one received load indication.

In some embodiments, the scheduling module 1012 may further be configured to perform the scheduling such that the interference caused by the user equipments in the first set of user equipments 123, 124, 125, 143, 144 served by the network node 111, 112 on the at least one PRR and the interference caused by the user equipments in the second set of user equipments 121, 122, 141, 142 served by the at least one neighboring network node 110 on the at least one PRR is below an interference threshold value. In some embodiments, the scheduling module 1012 may further be configured to determine a D2D transmission mode for at least one pair of user equipments 143, 144 that is to be scheduled for D2D communication on the at least one PRR at least partly based on the at least one received load indication.

In some embodiments, the transceiving module 1011 may further be configured to transmit the at least one received load indication for the at least one PRR to at least one user equipment in the first set of user equipments 123, 124, 125, 143, 144.

The embodiments for handling cellular communications and D2D communications of a first set of user equipments 123, 124, 125, 143, 144 served by the network node 111, 112 in a wireless telecommunications network 100 may be implemented through one or more processors, such as, e.g.

the processing circuitry 1110 in the network node 111, 112 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the network node 111, 112. The computer program code may e.g. be provided as pure program code in the network node 111, 112 or on a server and downloaded to the network node 111, 112. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 111, 112 may further comprise a memory 1020, which may be referred to or comprise one or more memory modules or units. The memory 1020 may be arranged to be used to store executable instructions and data, such as, e.g. D2D assistance information, to perform the methods described herein when being executed in the network node 111, 112. Those skilled in the art will also appreciate that the processing circuitry 1010 and the memory 1020 described above may refer to a combination of analog and digital circuits, and/or one or more processors configured with software and/or firmware, e.g. stored in the memory 1020, that when executed by the one or more processors such as the processing circuitry 1010 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, a computer program, comprising instructions which, when executed on at least one processor, e.g. the processing circuitry or module 1010, cause the at least one processor to carry out the method for handling cellular communications and D2D communications of a first set of user equipments 123, 124, 125, 126, 143, 144 as described above is presented. Also, a carrier containing the computer program, wherein the carrier is one of an electronic signal, optical signal, radio signal, or computer readable storage medium, is presented.

Figure 11:
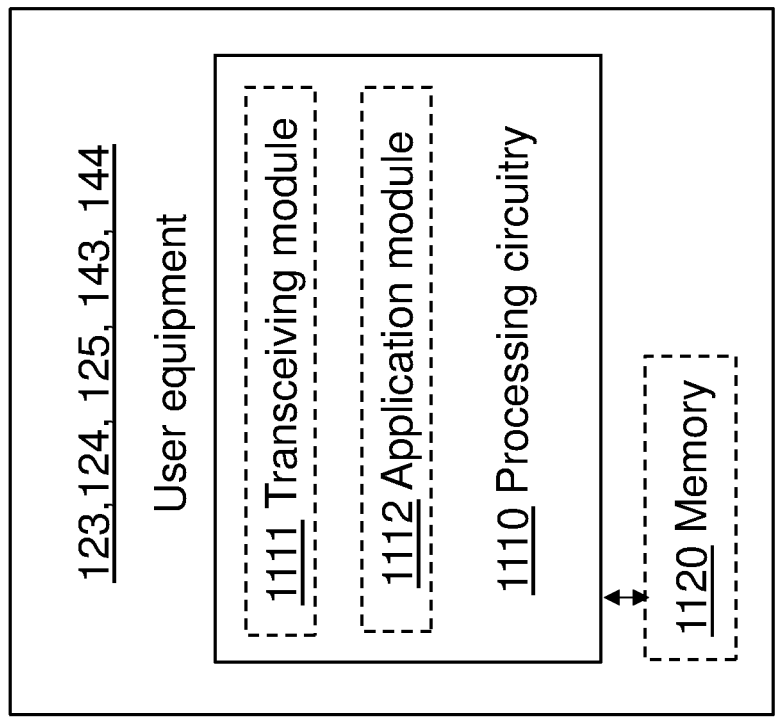
FIG. 11 is a block diagram depicting embodiments of a user equipment.

To perform the method actions in the user equipment in a first set of user equipments 123, 124, 125, 126, 143, 144 served by a network node 111, 112 for applying a radio operation in a wireless telecommunications network 100, the user equipment in a first set of user equipments 123, 124, 125, 126, 143, 144 may comprise the following arrangement depicted in FIG. 11.

FIG. 11 shows a schematic block diagram of embodiments of the user equipment in a first set of user equipments 123, 124, 125, 126, 143, 144. In some embodiments, the user equipment in a first set of user equipments 123, 124, 125, 126, 143, 144 may comprise a transceiving module 1111 and an application module 1112. In some embodiments, the user equipment in a first set of user equipments 123, 124, 125, 126, 143, 144 may comprise a processing circuitry 1110, which may also be referred to as processing module. The processing circuitry 1110 may comprise one or more of the transceiving module 1111 and the application module 1112, and perform the function thereof as described below.

The transceiving module 1111 is configured to receive at least one load indication for at least one PRR, wherein the at least one load indication indicates that a load on the at least one PRR is caused by cellular and/or D2D communications of a second set of user equipments 121, 122, 141, 142 served by at least one neighboring network node 110. The application module 1112 is configured to apply one or more radio operation for cellular and/or D2D communications on the at least one PRR based on the at least one received load indication.

In some embodiments, the application module 1112 may further be configured to send the received load indication to one or more other D2D capable user equipments.

In some embodiments, the transceiving module 1111 may further be configured to receive at least a second load indication for the at least one PRR. The second load indication may indicate that a load on the at least one PRR is caused by cellular and/or D2D communications of user equipments in the first set of user equipments 123, 124, 125, 126, 143, 144 served by the serving network node 111, 112 of the user equipment in a first set of user equipments 123, 124, 125, 126, 143, 144, that is, caused by other user equipments in the first set of user equipments 123, 124, 125, 126, 143, 144. In this case, the application module 1112 may further be configured to apply one or more radio operation for cellular and/or D2D communications on the at least one PRR based on the at least one received load indication and the second received load indication.

The embodiments for applying a radio operation in a wireless telecommunications network 100 may be implemented through one or more processors, such as, e.g. the processing circuitry 1110 in the user equipment in a first set of user equipments 123, 124, 125, 126, 143, 144 depicted in FIG. 11, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1110 in the user equipment in a first set of user equipments 123, 124, 125, 126, 143, 144. The computer program code may e.g. be provided as pure program code in the user equipment in a first set of user equipments 123, 124, 125, 126, 143, 144 or on a server and downloaded to the user equipment in a first set of user equipments 123, 124, 125, 126, 143, 144. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the user equipment in a first set of user equipments 123, 124, 125, 126, 143, 144 may further comprise a memory 1120, which may be referred to or comprise one or more memory modules or units. The memory 1120 may be arranged to be used to store executable instructions and data, such as, e.g. D2D assistance information, to perform the methods described herein when being executed in the user equipment in a first set of user equipments 123, 124, 125, 126, 143, 144. Those skilled in the art will also appreciate that the processing circuitry 1110 and the memory 1120 described above may refer to a combination of analog and digital circuits, and/or one or more processors configured with software and/or firmware, e.g. stored in the memory 1120, that when executed by the one or more processors such as the processing circuitry 1110 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, a computer program, comprising instructions which, when executed on at least one processor, e.g. the processing circuitry or module 1110, cause the at least one processor to carry out the method for applying a radio operation in a wireless telecommunications network 100 as described above is presented. Also, a carrier containing the computer program, wherein the carrier is one of an electronic signal, optical signal, radio signal, or computer readable storage medium, is presented.

The terminology used in the detailed description of the particular exemplary embodiments illustrated in the accompanying drawings is not intended to be limiting of the described methods, the network nodes 110, 111, 112, or the user equipments 123, 124, 125, 126, 143, 144, which instead should be construed in view of the enclosed claims.

A more general term radio resource (RR) or physical radio resource (PRR) is used herein. However the RR or PRR can be any of resources used for signal transmission between D2D user equipments or between any kind of user equipment and network node. Non-limiting examples of RR or PRR are time-frequency resource, Resource Element (RE), time slot, subframe, radio frame, Resource Block (RB), Physical Resource Block (PRB), Virtual RB (VRB), group of RBs, group of PRBs or group of VRBs.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

AWGN Additive White Gaussian Noise
DMLI D2D and MU MIMO Load Indicator
DMOI D2D and MU MIMO Overload Indicator
DoF Degree Of Freedom
D2D Device-to-Device
IRC Interference Rejection Combining
LTE Long Term Evolution
MMSE Minimum Mean Square Error
MRC Maximum Ratio Combining
MU MIMO Multi-User Multiple Input Multiple Output
MV Margin Value
MS Mode Selection
NA Not Applicable
OI Overload Indicator
PRB Physical Resource Block
RF Radio Frequency
RSRP Reference Symbol Received Power
RSSI Received Signal Strength Indicator
SIC Successive Interference Cancellation
SU MIMO Single User MIMO
TLI Traffic Load Indicator
UE User Equipment

The invention claimed is:

1. A method performed by a network node for assisting cellular communications and Device-to-Device (D2D) communications of a first set of user equipments served by at least one neighboring network node in a wireless telecommunications network, the method comprising:
determining a load on at least one Physical Radio Resource (PRR), which PRR is assigned to a second set of user equipments served by the network node for at least one of cellular communications and D2D communications; and
transmitting an indication of the load to the at least one neighboring network node, wherein the load indication further indicates that the load on the at least one PRR is caused by the cellular or D2D communications of the second set of user equipments served by the network node,
wherein the determining is performed specifically for each of the at least one neighboring network node and only for the at least one PRR that is determined to be relevant for each specific one of the at least one neighboring network node, respectively, and wherein the transmitting is performed by transmitting specific indications to each specific one of the at least one neighboring network node.

2. The method according to claim 1, wherein the load indication further indicates that the second set of user equipments are scheduled on the at least one PRR for cellular and D2D communications simultaneously.

3. The method according to claim 1, wherein at least the cellular communications of the second set of user equipments involves at least two spatial streams.

4. The method according to claim 1, wherein the cellular communications of the second set of user equipments includes at least one of Multi-User Multiple-Input-Multiple-Output (MU-MIMO) cellular communications and Single-User MIMO (SU-MIMO) cellular communications.

5. The method according to claim 1, wherein the load indication is determined based on one or more of:
the number of user equipments in the second set of user equipments that is assigned to, or scheduled on, the at least one PRR for cellular communications,
the total number of spatial streams used by the user equipments in the second set of user equipments for cellular communications on the at least one PRR, the number of user equipments in the second set of user equipments that is assigned to, or scheduled on, the at least one PRR for D2D communications, the total number of spatial streams used by the user equipments in the second set of user equipments for D2D communications on the at least one PRR, and whether spatial streams are orthogonal or shared between the user equipments in the second set of user equipments for cellular and D2D communications.

6. The method according to claim 1, wherein the load indication is an interference overload indication for the at least one PRR.

7. The method according to claim 1, wherein the determining is further based on mobility measurement reports of the user equipments in the second set of user equipments.

8. The method according to claim 1, wherein the determining is performed for user equipments among the second set of user equipments depending on upon at least one of: their location with respect to the location of the network node and their location with respect to the location of the at least one neighboring network node.

9. The method according to claim 1, wherein the load indication is determined for the cellular communications and D2D communications of the second set of user equipments performed on an uplink (UL) PRR or on a downlink (DL) PRR.

10. A method performed by a network node for handling cellular communications and Device-to-Device (D2D) communications of a first set of user equipments served by the network node in a wireless telecommunications network, the method comprising:

receiving, from at least one neighboring network node, at least one load indication for at least one Physical Radio Resource (PRR), wherein the at least one load indication indicates that a load on the at least one PRR is caused by at least one of cellular communications and D2D communications of a second set of user equipments served by the at least one neighboring network node; and scheduling at least one of cellular and D2D communications of the user equipments in the first set of user equipments on the at least one PRR, based on the at least one received load indication, wherein the scheduling is performed such that the interference caused by the user equipments in the first set of user equipments served by the network node on the at least one PRR and the interference caused by the user equipments in the second set of user equipments served by the at least one neighboring network node on the at least one PRR is below an interference threshold value.

11. The method according to claim 10, wherein the at least one received load indication indicates that the second set of user equipments is scheduled on the at least one PRR for cellular and D2D communications simultaneously.

12. The method according to claim 10, wherein at least the cellular communications of the second set of user equipments involves at least two spatial streams.

13. The method according to claim 10, wherein the cellular communications of the second set of user equipments includes at least one of: Multi-User Multiple-Input-Multiple-Output (MU-MIMO) cellular communications, and Single-User MIMO (SU-MIMO) cellular communications.

14. The method according to claim 10, wherein the at least one received load indication is an interference overload indication for the at least one PRR.

15. The method according to claim 10, wherein the scheduling further comprises adjusting the number of spatial streams used by the cellular and D2D communications of the user equipments in the first set of user equipments on the at least one PRR at least partly based on the at least one received load indication.

16. The method according to claim 10, wherein the scheduling further comprises adjusting one or more of: the number of user equipments in the first set of user equipments using the at least one PRR, the transmit power levels of the cellular and D2D communications used by the user equipments in the first set of user equipments on the at least one PRR, the transport format of the cellular and D2D communications used by the user equipments in the first set of user equipments on the at least one PRR, the precoding matrices of the cellular and D2D communications of the user equipments in the first set of user equipments assigned to the at least one PRR, and the data rate of the cellular and D2D communications of the user equipments in the first set of user equipments assigned to the at least one PRR, at least partly based on the at least one received load indication.

17. The method according to claim 10, further comprising transmitting the at least one received load indication for the at least one PRR to at least one user equipment in the first set of user equipments.

18. The method according to claim 10, wherein the scheduling further comprises determining a D2D transmission mode for at least one pair of user equipments that is to be scheduled for D2D communication on the at least one PRR at least partly based on the at least one received load indication.

19. A method performed by a user equipment in a first set of user equipments served by a network node for applying a radio operation in a wireless telecommunications network, the method comprising:

receiving at least one load indication for at least one Physical Radio Resource (PRR), wherein the at least one load indication indicates that a load on the at least one PRR is caused by at least one of cellular communications and Device-to-Device (D2D) communications of a second set of user equipments served by at least one neighboring network node; and applying one or more radio operations for cellular communication or D2D communications on the at least one PRR, based on the at least one received load indication.

20. The method according to claim 19, wherein the at least one received load indication indicates that the second set of user equipments is scheduled on the at least one PRR for cellular and D2D communications simultaneously.

21. The method according to claim 19, wherein the at least one received load indication is received when at least the cellular communication of the second set of user equipments involves at least two spatial streams.

22. The method according to claim 19, further comprising sending the received load indication to one or more other D2D capable user equipments.

23. The method according to claim 19, wherein the radio operations comprise one or more of:

adjusting number of the spatial streams used by the cellular or D2D communications of the user equipment;

adjusting the transmit power of cellular or D2D communications of the user equipment;

adjusting the transport format used by the cellular or D2D communications of the user equipment;

adjusting the precoding matrices of the cellular or D2D communications of the user equipment; and adjusting the data rate of the cellular or D2D communications of the user equipment.

24. The method according to claim 19, wherein the user equipment is further configured to receive a second load indication for at least one PRR, wherein the second load indication indicates that a load on the at least one PRR is caused by cellular or D2D communications of a first set of user equipments served by the serving network node of the user equipment and is further configured to apply one or more radio operations for cellular or D2D communications on the at least one PRR based on the at least one received load indication and the second received load indication.

25. A network node for assisting cellular communications and Device-to-Device (D2D) communications of a first set of user equipments served by at least one neighboring network node in a wireless telecommunications network, wherein the network node comprises:
communication circuitry configured for communicating with the at least one neighboring network node; and
processing circuitry operatively associated with the communication circuitry and configured to:
determine a load on at least one Physical Radio Resource (PRR), wherein the at least one PRR is assigned to a second set of user equipments served by the network node for at least one of cellular communications and D2D communications; and
transmit an indication of the load to the at least one neighboring network node, wherein the load indication further indicates that the load on the at least one PRR is caused by cellular or D2D communications of the second set of user equipments served by the network node,
wherein the processing circuitry is further configured to send the received load indication to one or more other user equipments that are D2D capable.

26. A network node for handling cellular communications and Device-to-Device (D2D) communications of a first set of user equipments served by the network node in a wireless telecommunications network, wherein the network node comprises:
communication circuitry configured to receive, from at least one neighboring network node, at least one load indication for at least one Physical Radio Resource (PRR), wherein the at least one load indication indicates that a load on the at least one PRR is caused by at least one of cellular communications and D2D communications of a second set of user equipments served by the at least one neighboring network node; and
processing circuitry configured to schedule at least one of cellular and D2D communications of the user equipments in the first set of user equipments on the at least one PRR, based on the at least one received load indication,
wherein the processing circuitry is further configured to adjust the number of spatial streams used by the cellular and D2D communications of the user equipments in the first set of user equipments on the at least one PRR at least partly based on the at least one received load indication.

27. The network node according to claim 26, wherein the processing circuitry is further configured to adjust one or more of: the number of user equipments in the first set of user equipments using the at least one PRR, the transmit power levels of the cellular and D2D communications used by the user equipments in the first set of user equipments on the at least one PRR, the transport format of the cellular and D2D communications used by the user equipments in the first set of user equipments on the at least one PRR, the precoding matrices of the cellular and D2D communications of the user equipments in the first set of user equipments assigned to the at least one PRR, and the data rate of the cellular and D2D communications of the user equipments in the first set of user equipments assigned to the at least one PRR, at least partly based on the at least one received load indication.

28. The network node according to claim 26, wherein the processing circuitry is further configured to perform the scheduling such that the interference caused by the user equipments in the first set of user equipments served by the network node on the at least one PRR and the interference caused by the user equipments in the second set of user equipments served by the at least one neighboring network node on the at least one PRR is below an interference threshold value.

29. The network node according to claim 26, wherein the processing circuitry is further configured to transmit the at least one received load indication for the at least one PRR to at least one user equipment in the first set of user equipments.

30. The network node according to claim 26, wherein the processing circuitry is further configured to determine a D2D transmission mode for at least one pair of user equipments that is to be scheduled for D2D communication on the at least one PRR at least partly based on the at least one received load indication.

31. A user equipment configured for operation in a wireless telecommunications network and comprising:
communication circuitry configured for communicating with a network node in the wireless telecommunications network; and
processing circuitry operatively associated with the communication circuitry and configured to:
when operating in a first set of user equipments served by the network node, receive at least one load indication for at least one Physical Radio Resource (PRR), wherein the at least one load indication indicates that a load on the at least one PRR is caused by at least one of cellular communications and Device-to-Device (D2D) communications of a second set of user equipments served by at least one neighboring network node; and
apply one or more radio operations for at least one of cellular communications and D2D communications on the at least one PRR, based on the at least one received load indication.

32. The user equipment according to claim 31, wherein the processing circuitry is further configured to send the received load indication to one or more other user equipments that are D2D capable.

* * * * *